US010611948B2

(12) United States Patent
Gallo et al.

(10) Patent No.: US 10,611,948 B2
(45) Date of Patent: Apr. 7, 2020

(54) METHOD OF INCREASING LUBRICITY OF WELLBORE FLUIDS

(71) Applicant: LAMBERTI SPA, Albizzate (VA) (IT)

(72) Inventors: Erik Gallo, Mottalciata (IT); Luigi Merli, Saronno (IT); Pierangelo Pirovano, Comerio (IT); Letizia Privitera, Sumirago (IT); Massimo Cecchetto, Oggiona con Santo Stefano (IT); Giovanni Floridi, Novara (IT); Giuseppe Li Bassi, Gavirate (IT)

(73) Assignee: Lamberti SPA, Albizzate (VA) (IT)

( * ) Notice: Subject to any disclaimer, the term of this patent is extended or adjusted under 35 U.S.C. 154(b) by 0 days.

(21) Appl. No.: 15/526,614

(22) PCT Filed: Nov. 6, 2015

(86) PCT No.: PCT/EP2015/075976
§ 371 (c)(1),
(2) Date: May 12, 2017

(87) PCT Pub. No.: WO2016/075052
PCT Pub. Date: May 19, 2016

(65) Prior Publication Data
US 2017/0321103 A1 Nov. 9, 2017

(30) Foreign Application Priority Data

Nov. 12, 2014 (IT) .............................. VA2014A0033

(51) Int. Cl.
E21B 21/00 (2006.01)
C09K 8/36 (2006.01)
(Continued)

(52) U.S. Cl.
CPC .................. *C09K 8/36* (2013.01); *C09K 8/58* (2013.01); *C09K 8/584* (2013.01); *E21B 21/00* (2013.01);
(Continued)

(58) Field of Classification Search
None
See application file for complete search history.

(56) References Cited

U.S. PATENT DOCUMENTS 5,618,780 A    4/1997  Argillier et al.
6,299,884 B1  10/2001  Van Nest et al.
(Continued)

FOREIGN PATENT DOCUMENTS

CA    2586832 A1    11/2007
CN    1699500 A    11/2005
WO    2013116921 A1    10/2012

OTHER PUBLICATIONS

Yang, Z., et al., Research and Application of Nanoscale Emulsion Lubrication Material for Drilling Fluid in Daqing Oil Field, SPE161899.
(Continued)

*Primary Examiner* — Angela M DiTrani Leff
(74) *Attorney, Agent, or Firm* — Elisabeth Rather Healey; Vorys, Sater, Seymour and Pease LLP

(57) ABSTRACT

Method for increasing lubricity of a wellbore fluid comprising the following steps: i) preparing a water in oil microemulsion that contains insoluble particles of metal hydroxides and/or metal oxides in the inner aqueous phase, the insoluble particles being synthesized from their salt precursors in the water droplets of the microemulsion; ii) adding to the wellbore fluid the water in oil microemulsion; iii) injecting the wellbore fluid into a subterranean formation and iv) performing the drilling, completion or coiled tubing operations in the subterranean formation.

20 Claims, 2 Drawing Sheets

(51) Int. Cl.
*C09K 8/58* (2006.01)
*C09K 8/584* (2006.01)

(52) U.S. Cl.
CPC ...... *C09K 2208/10* (2013.01); *C09K 2208/14* (2013.01); *C09K 2208/34* (2013.01)

(56) References Cited

U.S. PATENT DOCUMENTS

| | | |
|---|---|---|
| 6,451,325 B1 | 9/2002 | Van Nest et al. |
| 7,902,123 B2 | 3/2011 | Harrison et al. |
| 8,071,510 B2 | 12/2011 | Scoggins et al. |
| 8,148,305 B2 | 4/2012 | Westfechtel et al. |
| 8,282,950 B2 | 10/2012 | Bohus et al. |
| 9,701,885 B2* | 7/2017 | Husein ............ C09K 8/36 |
| 2012/0015852 A1* | 1/2012 | Quintero ............ C09K 8/032 507/112 |
| 2013/0261033 A1 | 10/2013 | Nguyen et al. |

OTHER PUBLICATIONS

Prince, L.M. In Microemulsions Theory and Practice, Academic Press 1977, p. 192.

Langevin D., In Microemulsions, Account of Chemical Research, 21 (7), 255-260, 1988.

Lopez-Quintela, M., "Synthesis of Nanomaterials in Microemulsions: formation mechanisms and growth control," Current Opinion in Colloid and Interface Science 8 (2003) 137-144.

Capek, "Preparation of Metal Nanoparticles in Water-in-Oil (w/o) microemulsion," Advances in Colloid and Interface Science 110 (2004) 49-74.

* cited by examiner

METHOD OF INCREASING LUBRICITY OF WELLBORE FLUIDS

FIELD OF THE INVENTION

The present invention relates to a method for increasing lubricity and for reducing the oscillation of the coefficient of friction of oil and gas wellbore fluids by adding to the fluids a microemulsion that contains insoluble particles of metal hydroxides and/or metal oxides in the inner aqueous phase. Wellbore fluids whose lubricity is improved by the method of the invention are in particular drilling, completion and coiled tubing fluids.

BACKGROUND OF THE ART

Oil and gas wellbore fluids (wellbore fluids) are fluids that are used downhole during the operations performed for the purpose of exploration or extraction of gas or oil from subterranean formations.

Drilling fluids, which are also called drilling muds, are complex mixtures of chemicals used in drilling operations for the production of hydrocarbons and natural gas from subterranean reservoirs.

Drilling fluids are pumped into the drilling shaft and exit from the drilling bit through openings. The drilling fluids return to the surface through the annulus between the outside of the drilling shaft and the bore hole wall.

Drilling fluids perform a number of functions. Exemplary of these functions are carrying drill cuttings up to the surface and suspending them when the fluid circulation is stopped; creating a filter cake on the bore hole walls to reduce permeability; cooling and lubricating the drill bit; creating hydrostatic pressure to avoid uncontrolled blow outs and to help supporting the weight of the bore hole walls; and acting as lubricant between the drill bit, the drill string and the bore hole walls. In general, the use of drilling fluids alone is not sufficient to reduce friction substantially, especially if horizontal and highly deviated wells are considered. Thus, in general, a suitable lubricant additive has to be added to the drilling fluid.

Drilling fluids may be of the water based type or of the oil based type.

Water based drilling fluids are environmentally safer and less costly compared to oil based fluids, but the latter usually present higher lubricating performances. In both cases, however, lubricant additives are regularly employed.

At the end of the drilling operations, the drilling mud is usually replaced with a completion fluid (CF). CF are fluids employed in completion operations, i.e. in the whole series of actions/processes required for making the well ready for production. CF may comprise brines free from undissolved solids (based on chlorides, bromides and formates), as well as any fluid with proper density and flow characteristics, chemically compatible with the formation.

CF normally require reliable and efficient lubricants for lowering the torque and drag due to the frictional forces within the well which may induce the sticking of downhole tubulars and coils.

In wellbore operations, lubrication of coiled tubing (CT) is also of primary significance. CT usually refers to long metal pipes rolled up on a large reel. CT can be used, by way of example, for interventions into gas and oil wells as well as production tubing in depleted gas wells. CT can thus be employed for operations analogous to wirelining where it offers some advantages. Among them, the coil can be pushed into the hole (rather than relying on gravity) and chemicals can be pumped through the coil.

Coiled tubing fluids (CTF) are used to pose the coiled tubing and require the addition of efficient lubricants too.

Many lubricants for applications into wellbore fluids have been described, including solids, such as plastic or glass beads, nanoparticles and graphite, or liquids, such as oils, synthetic fluids, glycols, modified vegetable oils, fatty acid soaps and surfactants.

By way of example, U.S. Pat. No. 5,618,780 relates to an optimized lubricating composition including, in useful amounts, an ester and a fatty acid.

U.S. Pat. No. 8,071,510 describes a lubricant based on a water-soluble or water-dispersible salt of a sulfonated (sulfated) vegetable oil or a derivative thereof, such as a sulfonated (sulfated) castor oil.

In U.S. Pat. No. 8,148,305, the use of oligoglycerol fatty acid esters as additives in water-based drilling mud compositions for improving the lubricating action of these mud systems is described.

Microemulsions of oils and fatty esters, which are typical ingredients of lubricants, are well known and described in the patent literature, as adjuvants for pharmaceutical applications (by way of example in U.S. Pat. No. 6,451,325 and U.S. Pat. No. 6,299,884), for agrochemical applications (by way of example in U.S. Pat. No. 8,282,950) and also for use in the oil industry (by way of example in US 2013/0261033 and U.S. Pat. No. 7,902,123).

It has now been found that water in oil microemulsions containing insoluble particles of metal hydroxides and/or metal oxides in the inner aqueous phase are very efficient in increasing the lubricity of wellbore fluids, thus reducing the coefficient of friction of drilling, completion and coiled tubing fluids without significantly altering the mud rheology. The microemulsions are particularly effective when the insoluble particles of metal hydroxides and metal oxides have been synthesized from their salt precursors in the water droplets of the microemulsion and are nanosized, i.e. are between 1 nm and 100 nm in size; actually, it has been observed that nanoparticles that have been synthetised in microemulsion show a surprisingly higher lubricating effect in well fluids.

The use of nanoparticles as lubricity additives in well fluids is already known. IADC/SPE 161899 reports that a lubricating material containing nanoscale solid corpuscles was used in drilling fluids in Daqing Oil Field.

CA 2586832 discloses a drilling bit grease that comprises form 0.1 to 10% by weight of a nanomaterial.

CN 1699500 reports that the addition of pre-prepared nanoparticles to emulsion lubricants for drilling fluids enhance their stability.

In WO 2013/116921 the lubricant additive for drilling fluids is based on nanoparticles that are prepared in situ in the drilling fluid or ex situ, by high shear mixing two aqueous solutions containing the nanoparticles precursors. Nonetheless, as far as the Applicant knows, the use of microemulsions containing insoluble particles of metal hydroxides and/or metal oxides in the dispersed (or inner) aqueous phase, for increasing the lubricity of drilling or completion fluids, has never been reported.

SUMMARY OF THE INVENTION

The object of the present invention is a method for increasing lubricity of a wellbore fluid which is a drilling, completion or coiled tubing fluid, comprising the following steps: i) preparing a water in oil microemulsion that contains insoluble particles of metal hydroxides and/or metal oxides in the inner aqueous phase; ii) adding to the wellbore fluid the water in oil microemulsion; iii) injecting the wellbore fluid into a subterranean formation and iv) performing drilling, completion or coiled tubing operations in the subterranean formation.

DETAILED DESCRIPTION OF THE INVENTION

Figure 1:
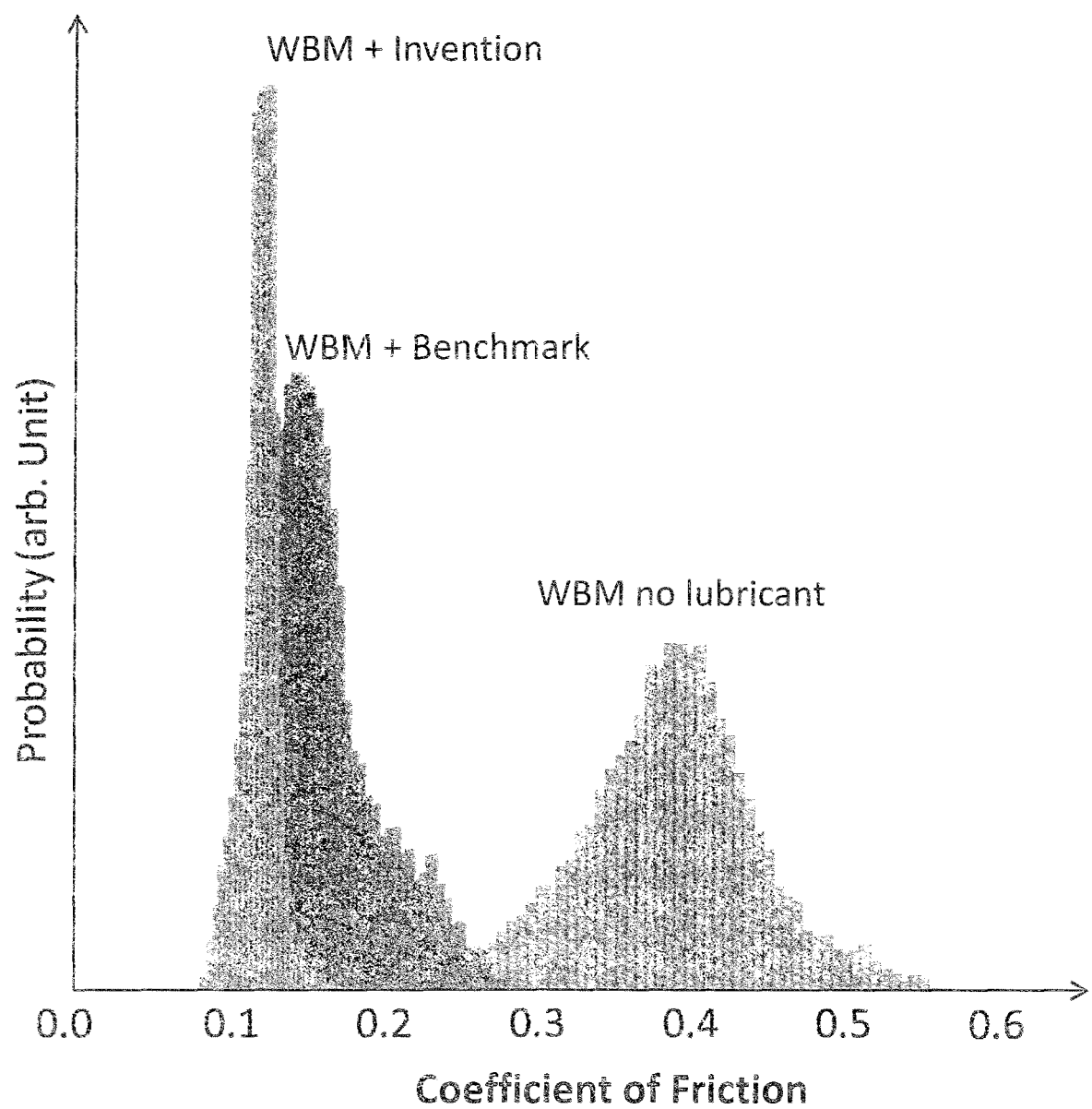
FIG. 1 shows the comparison of the distribution of the coefficient of friction (CoF) in the case of (i) a water based fluid employing a microemulsion according to the disclosure, (ii) the same water based fluid containing a commercial lubricant and (iii) the same water based fluid without any lubricant additive.

The method of the invention involves the use of a microemulsion.

Microemulsions can be classified in two main categories: water in oil (w-o) microemulsions, in which the dispersed phase (or inner phase) is aqueous, and oil in water (o-w) microemulsions, in which the dispersed phase is oleaginous. The method of the invention involves the use of a liquid water in oil (w-o) microemulsion.

One of the most significant distinction between normal emulsions and microemulsions relies on the size of the internal or dispersed droplets or micelles.

Normal emulsions, also referred to as macroemulsions, are usually formulated using three main ingredients: i. polar solvent (e.g. water), ii. apolar solvent (e.g. oil) and iii. surfactants or solid particles; they are milky in aspect and generally exhibit limited stability.

On the contrary, microemulsions are formulated under rather particular circumstances which commonly require an additional variable for the fine tuning of the optimum conditions, i.e. the addition of co-surfactants and/or salts, as it is described for instance by Prince L. M., in Microemulsions Theory and Practice, Academic Press 1977, p 192 and by Langevin D., in Microemulsions, Account of Chemical Research, 21 (7), 255-260, 1988.

In general, their typical droplets dimensions are less than the lowest wavelength of the visible light (380 nm) or a little larger, and, as a consequence, a properly conceived liquid microemulsions commonly results in an optically transparent or translucent system, even without significant input of mechanical energy during preparation (the stirring can be very slow). Furthermore, as reported in L. M. Prince, ibidem, p 4, liquid microemulsions do not separate if spun in a laboratory centrifuge for five minutes at 100 G. Accordingly, the method of the disclosure comprises the use of liquid microemulsions that contain an aqueous phase, an oleaginous phase and at least one surfactant, are transparent or translucent and stable; the microemulsions according to the disclosure thus show resistance to significant thermal and mechanical shocks.

By "stable" microemulsions we mean microemulsions that do not separate if spun in a laboratory centrifuge for five minutes at 100 G.

By "transparent" or "translucent" microemulsion we mean a microemulsions whose droplets dimensions are less than 500 nm.

By "transparent" microemulsion we mean a microemulsions whose droplets dimensions are less than 380 nm.

The microemulsions that are used in the method of the disclosure are preferably transparent.

The size of the micelles (or droplets) of microemulsions, as well as their dimensional distribution, may be determined using several spectroscopic and scattering methods (e.g. laser diffraction and small angle X-ray scattering). Typically, the w-o microemulsion of step i) comprises from 2 to 20 by weight % of aqueous phase, from 5 to 40 by weight % of surfactants, from 0 to 20 by weight % of co-surfactants and from 40 to 90 by weight % of oleaginous phase; preferably, the w-o microemulsion comprises from 4 to 10 by weight % of aqueous phase, from 20 to 35 by weight % of surfactants, from 6 to 15 by weight % of co-surfactants and from 40 to 70 by weight % of oleaginous phase. An essential feature of the microemulsions of the method of the invention is the presence, in their internal aqueous phase, of water insoluble particles of metal hydroxides and/or oxides, each particle being smaller than the aqueous droplet containing it.

In a preferred embodiment, the insoluble particles of metal hydroxides and/or metal oxides are insoluble particles of zinc, manganese or magnesium hydroxides and/or oxides, or mixture thereof.

It has been found that these insoluble particles of metal hydroxides and/or oxide are effective to enhance significantly the lubricating performances of wellbore fluids even at the small concentrations that are obtainable by preparing them from their salt precursor directly in the inner phase of a w-o microemulsion.

A further advantage of preparing the insoluble particles of metal hydroxides and/or oxide from their salt precursor directly in the inner phase of a w-o microemulsion is the fact that their obtainment does not require the use of high shear mixing usually required for the preparation of macroemulsion. Thus, the nanoparticles form directly from the solution of their precursors within the microemulsions.

The aqueous phase of the microemulsion may contain, besides water and the insoluble particles of metal hydroxides and/or oxides, other additives: freezing point depressants, such as water soluble glycols, glycol ethers, or polyols (e.g. glycerol, ethylene glycol, propylene glycol); rheology modifiers, such as water soluble synthetic, semi synthetic or natural polymers (e.g. xanthan gum, polyacrylate thickeners); water soluble salts (e.g. sodium acetate, sodium chloride).

The oleaginous phase mainly consists of any water immiscible fluid (oil) suitable for use in emulsions, that represents at least 90% by weight of the oleaginous phase. The oil may derive from a natural or synthetic source. Examples of suitable oils include, without limitation, vegetable oils, diesel oils, paraffin oils, mineral oils, low toxicity mineral oils, olefins, esters, synthetic oils such as polyolefins, ethers, acetals, dialkyl carbonates, hydrocarbons and combinations thereof.

The preferred oils are paraffin oils, low toxicity mineral oils, mineral oils, vegetable oils, polyolefins, olefins, esters and mixtures thereof. Factors determining the choice of the oil(s) include but are not limited to a)cost, b) Hydrophylic Liphophylic Balance (HLB), c) environmental compatibility, d) toxicological profile and e) availability.

The oleaginous phase may also comprise an oil soluble rheology modifier (e.g. styrene-butadiene-propylene co-polymers, organoclays, polyacrylates). The surfactants used for the invention are chosen among those that are normally available within the market. Example of utilizable surfactants are: sorbitan esters (e.g. sorbitan monolaurate, sorbitan monopalmitate, sorbitan monostearate, sorbitan monooleate, sorbitan trioleate), ethoxylated sorbitan esters (e.g. sorbitan monolaurate 20 EO (i.e. ethoxylated with 20 moles of ethylene oxide), sorbitan monolaurate 4 EO, sorbitan monopalmitate 20 EO, sorbitan monostearate 20 EO, sorbitan monooleate 20 EO, sorbitan monooleate 5 EO, sorbitan trioleate 20 EO), coco diethanolamide, ethoxylated and/or propoxylated nonylphenols, ethoxylated octylphenols, ethoxylated tributylphenols, ethoxylated phenols, ethoxylated fatty alcohols, phosphate esters, alkyl ethoxy citrates, ethoxylated coco monoethanolamide, ethoxylated fatty amines, fatty esters, ethoxylated castor oils, hydrogenated castor oils, polyalkylenglycols, sulphated castor oils, sulphosuccinates (di-octylsulphosuccinate sodium salt, di-isodecyl sulphosuccinate sodium salt, alkylether sulphosuccinates sodium salt, alkylarylether sulphosuccinates sodium salt), fatty alcohol sulphates, fatty alcohol ethoxy sulphates, polyamides of fatty acids, dodecylbenzene sulphonates, alkylbenzene sulphonates, methyl naphthalene sulphonates, ethoxylated distyrylphenols, ethoxylated tristyrylphenol, alkoxylated fatty alcohols and alkoxylated nonylphenols, and mixture thereof.

One or more surfactants may be contained in the microemulsion.

Preferably, the surfactant, or the mixture of surfactants, has HLB in the range from 6 to 20; most preferably, a HLB in this range is obtained employing at least one surfactant with HLB in the range from 10 to 17 and at least one surfactant with HLB in the range from 1.8 to 6.

The co-surfactant is a chemical (e.g. an optionally ethoxylated, short, medium or long chain alcohol or amine, or a low HLB non-ionic chemicals) that when associated to the surfactants, helps the stabilization of the interfacial layer. The co-surfactant should show good compatibility with the other chemicals comprising the system, as it is well known in the art.

Typical co-surfactants that can be used to prepare the microemulsions of the invention are linear or branched, saturated or unsaturated primary alcohols (e.g. isobutanol, isoamyl alcohol, 2-methyl-1-butanol, oleyl alcohol, 9-decenol), 3-phenylpropanol, phenethyl alcohol, tryptophol, stearic acid, mixture thereof.

As mentioned above, in the method of the invention the w-o microemulsion that is added to the wellbore fluids contains water insoluble particles of metal hydroxides and/or metal oxides in the inner phase.

These microemulsions may be prepared by a process that includes the synthesis of the metal hydroxides and/or metal oxides from their salt precursors in the water droplets of the microemulsion, which is prepared employing a water to surfactants molar ratio between 4:1 and 34:1.

This method of preparation of w-o microemulsions containing water insoluble particles of metal hydroxides or oxides in their inner aqueous phase is a technique which is well known in the literature and generally produces water insoluble particles that are from 1 nm to 100 nm in size (nanoparticles). A review of the evolution of this technique may be found in M. A. Lopez-Quintela, in Current Opinion in Colloid & Interface Science, 8 (2003), p. 137-144 and in I. Capek, in Advances in Colloid and Interface Sciences, 110 (2004), p. 49-74.

According to a first and preferred embodiment of the invention, the preparation of the microemulsion comprises the following steps: A) a first water in oil intermediate microemulsion is prepared by adding an aqueous solution of a metal salt to a mixture of surfactant, oil and optional co-surfactant, under stirring; B) a second water in oil intermediate microemulsion is prepared by adding an aqueous solution of a base to a mixture of surfactant, oil and optional co-surfactant, under stirring; C) the first and second intermediate microemulsions are mixed together to form the water in oil microemulsion that is used in the method of the invention.

According to a second embodiment, the preparation of the microemulsion comprises the following steps: A') a water in oil intermediate microemulsion is prepared by adding an aqueous solution of a metal salt to a mixture of surfactant, oil and optional co-surfactant, under stirring; B') an aqueous solution of a base is added and stirred with the intermediate microemulsion to form the water in oil microemulsion that is used in the method of the invention. According to a third embodiment, the preparation of the microemulsion comprises the following steps: A") a water in oil intermediate microemulsion is prepared by adding an aqueous solution of a base to a mixture of surfactant, oil and optional co-surfactant, under stirring; B") an aqueous solution of a metal salt is added and stirred with the intermediate microemulsion to form the final water in oil microemulsion that is used in the method of the invention. The preparation steps of the water in oil microemulsion can be carried out between 5 and 50° C., depending on the chemicals involved in the preparation.

Several metal salts that by reaction with a base form water insoluble metal hydroxides and/or oxides can be employed: zinc chloride, zinc nitrate, zinc acetate, zinc iodide, zinc bromide, zinc sulfate, manganese chloride, manganese nitrate, manganese acetate, manganese bromide, manganese sulfate, manganese iodide, magnesium chloride, magnesium acetate, and the like. Preferably, the metal salts that are employed are zinc chloride, zinc nitrate, zinc acetate.

Preferably the base that is used in steps B), B') and A") of the preparation of the microemulsions is sodium hydroxide, potassium hydroxide and ammonia; most preferably, the base is sodium hydroxide or potassium hydroxide.

The addition of a small amount of an acid into the aqueous solutions of metal salts that are used in the preparation of the microemulsions may be advantageous, to enhance the solubility of the metal salt; the most useful acids are hydrogen chloride, acetic acid, citric acid.

The concentration of the base in the aqueous solutions of steps B), B') and A") typically ranges between 0.25 M and 2.0 M, and also the concentration of the metal salt in the aqueous solutions of steps A), A') and B") may range between 0.25 M and 2.5 M.

Preferably, in the preparation of the microemulsion, a slight defect of base is used relative to the salt (typically 75-90 equivalents of base per 100 equivalents of metal salt) and approximately the same volume of aqueous solutions of base and metal salt are used.

The concentration of water insoluble particles of metal hydroxide and/or metal oxide in the aqueous phase of the microemulsion is generally from 0.2 to 2.0 M.

According to a particularly preferred embodiment of the invention, the water insoluble particles are nanoparticles of zinc hydroxide, zinc oxide, or mixtures thereof.

Most preferably they are nanoparticles of zinc hydroxide, that are produced in excess of zinc salt, and have particle sizes between 1 nm and 40 nm, preferably between 5 and 40 nm, as determined via small angle X-ray scattering; these nanoparticles provide the best results in terms of lubricity enhancement, lubricity preservation and mitigation of the oscillations of the coefficient of friction over time.

According to a particular embodiment of the present disclosure, before being added to the wellbore fluid, in step ii) the water in oil microemulsion may be diluted in water to form a water in oil in water (w-o-w) microemulsion or a diluted water in oil microemulsion.

The dilution water may comprise the freezing point depressants and rheology modifiers that are utilizable in the aqueous phase of the microemulsion and it contains organic or inorganic salts to equilibrate the ionic strength of the aqueous phase of the microemulsion.

The w-o-w microemulsion and the diluted water in oil microemulsion may comprise up to 70 by weight % of aqueous phase(s).

The high compatibility of w-o-w and diluted microemulsion with freezing point depressants, such as glycols, glycol ethers and glycerol, and salts, is aimed towards the lowering of the lubricant freezing point (i.e. improves the product pour point), that when salts are added, is ruled by the Blagden's law. Depending on the oil phase and on the freezing point depressant concentration in the water phase, it is possible to decrease the freezing point of the starting microemulsion of more than 10° C.

The drilling fluids that can be used in the method of the invention may be water based drilling fluids (i.e. a drilling fluid in which water is in the continuous phase of a direct emulsion, solution or dispersion) or oil based drilling fluids (i.e. a drilling fluid in which water is in the internal phase of an inverse emulsion); preferably the drilling fluids are water based drilling fluids, and more preferably are water based drilling fluids in which water is in the continuous phase of a solution or dispersion.

The drilling fluids may be formulated with brines.

Useful salts for the preparation of brines include, but are not limited to, sodium, calcium, aluminum, magnesium, strontium, potassium and lithium salts of chlorides, carbonates, bromides, iodides, chlorates, bromates, nitrates, formates, phosphates, sulfates.

The brine may also comprise seawater.

The density of the drilling fluid is generally regulated by increasing the salt concentration of the brine and/or by the addition of specific weighting agents.

Suitable weighting agents are barite, siderite, galena, dolomite, ilmenite, hematite, iron oxides, calcium carbonates and the like.

The drilling fluids usually also contain rheology modifiers.

Suitable rheology modifiers are gelling agents and viscosifiers, such as natural polymers or derivatives thereof, biopolymers, high molecular weight synthetic polymers, and the like.

Other conventional additives that may be contained in the drilling fluid are filtrate loss reducers (e.g. starch, modified starch, polyanionic cellulose), thinning agents and dispersants (such as ligninsulfonates, tannins, polyacrylates and the like).

The completion fluid and coiled tubing fluid may be the same as the drilling fluid or may be different. Preferably they comprises at least 20% w/w of water, and more preferably at least 50% w/w of water. Any completion fluid or coiled tubing fluid suitable for use in a completion or coiled tubing operation may be employed in the method of the present disclosure. In an embodiment, the completion and coiled tubing fluid is a fluid having a density, chemical composition and flow characteristics compatible with the formation to which it is introduced.

The method of the present invention, beside increasing the lubricity of drilling fluids, completion fluids and fluids for coiled tubing applications, preserves lubricity of the wellbore operating system for a significant amount of time after replacement of the mentioned fluids with unlubricated fluids (i.e. fluids that does not contain lubricant), despite the extreme conditions that are encountered in oil and gas wellbores operations.

Moreover, the method very efficiently prevents the stick-slip occurring between the sliding lubricated solid surfaces and provides i) low value for the CoF and ii) narrow probability distribution of the coefficient of friction (CoF), i.e., low full width at half maximum of the distribution of the CoF. The last requirement is valuable for determining the reliability of the lubricant over time and for reducing the stress on the motor powering the drilling pipe.

The oscillations of the CoF during time can be due to the presence of solids into the mud and/or may be the consequence of the stick slip phenomenon. Surprisingly, we found that the method of the disclosure is valuable for reducing such oscillations.

EXAMPLES

In the following examples the following chemicals have been used:
Sorbirol O=sorbitan monooleate, Lamberti SpA, IT;
Sorbilene O=polyoxyethylene (20) sorbitan monooelate, Lamberti SpA, IT;
Polyamide Emulsifier=emulsifier from tall-oil fatty acids, polyethylenepolyamines and maleic anhydride (CAS No. 68990-47-6), Lamberti SpA, IT;
Imbirol OT/NA/70=dioctyl sodium sulfosuccinate, Lamberti SpA, IT;
Sorbilene L=polyoxyethylene (20) sorbitan monolaurate, Lamberti SpA, IT;
Rolamid CD=N-bis(2-hydroxyethyl)cocoamide, Lamberti SpA, IT;
Sorbilene TO=polyoxyethylene (20) sorbitan trioelate, Lamberti SpA, IT;
Rolfor 1012/490=polyoxyethylene (5) C10-C12 linear alcohol, Lamberti SpA, IT
Emulson AG/18C=Castor oil ethoxylated, dioleate, Lamberti SpA, IT
Emulam PE=primary emulsifier, Lamberti SpA, IT
Emulam SE=secondary emulsifier, Lamberti SpA, IT
Emulam V Plus=organoclay, Lamberti USA, US
TBL=commercial lubricant based on soybean oil and polyoxyethylene (15) C12-C14 linear alcohol
Lampac EXLO=polyanionic cellulose, Lamberti SpA, IT
In the Examples w/w means by weight.

Example 1

A solution, hereafter referred to as surfactants mixture (SM), of Sorbirol O (42% w/w) and Sorbilene O (58% w/w) is prepared. SM is added to a low toxicity mineral oil (LTMO) and stirred for fifteen minutes. The resulting system, hereafter S1, comprises of 33.4% w/w of SM and 66.6% w/w of LTMO. An aqueous solution, hereafter A1, containing 4% w/w of zinc chloride and 0.15% w/w of a solution 30% w/w of hydrogen chloride is prepared. An aqueous solution, hereafter A2, containing 2.6% w/w of sodium hydroxide is prepared. One batch containing S1 is kept at r.t. and stirred while 5.6% w/w of A1 is added very slowly. Similarly another batch of S1 is prepared, kept at room temperature, stirred while adding 2.3% w/w of Polyamide Emulsifier. After ten minutes, 5.3% w/w of A2 is added slowly. The batches, prepared as above, become transparent. Subsequently, they are mixed at r.t. for one hours. The final transparent product is referred to as EX1.

Example 2

23% w/w of Imbirol OT/NA/70 and 2% w/w of Sorbilene L is added to a mixture of low toxicity mineral oil and alpha-olefins and stirred for five minutes. The transparent resulting system is referred to as S2. An aqueous solution, hereafter A3, containing 6% w/w glycerol, 5% w/w of zinc chloride, 1.5% w/w of manganese chloride and 0.35% w/w of a solution 30% w/w of hydrogen chloride is prepared. An aqueous solution, hereafter A4, containing 3% w/w of sodium hydroxide is prepared. One batch containing S2 is kept at 20° C. and stirred and 16% w/w of A3 is added slowly. Similarly another batch of S2 is prepared, kept at room temperature, stirred while adding 1.2% w/w of Rolamid CD; after ten minutes, 16% w/w of A4 is added slowly. The batches, prepared as above, become then transparent. Subsequently, they are mixed at 10° C. for three hours. The final transparent product is referred to as EX2.

Example 3

A solution, hereafter referred to as surfactants mixture (SM3), of Sorbilene TO (86.6% w/w) and Sorbirol TO (13.4% w/w) is prepared. SM3 is added to a mixture of low toxicity mineral oil (LTMO) and canola oil while stirring for twenty minutes. The resulting system, hereafter S3, comprises of 30.2% w/w of SM3 and 69.8% w/w of oil mixture. 2.3% w/w of ROLFOR 1012/490 is added to S3 while stirring for ten minutes. The resulting system will be referred to as S3'. An aqueous solution, hereafter A5, containing 6% w/w of anhydrous zinc acetate and 0.4% w/w of a solution 80% w/w of acetic acid is prepared. An aqueous solution, hereafter A6, containing 2.8% w/w of sodium hydroxide is prepared. One batch containing S3' is kept at room temperature and stirred while 7% w/w of A5 is added slowly. Similarly another batch of S3' is prepared, kept at room temperature, stirred while adding 3.2% w/w of isobutyl alcohol. After 10 minutes, 5.5% w/w of A6 is added very slowly. The batches, prepared as above, become then transparent. Subsequently, they are mixed at 10° C. for 3 hours. The final transparent product is EX3.

Example 4

A mixture of 33% w/w soya oil, 53% w/w of canola oil and 14% castor oil is prepared. A surfactants mixture (SM4) comprising 13.5% w/w of Sorbirol TO, 11.5% w/w of EMULSON AG/18C, 0.04% w/w Rolamid CD and 21.6% w/w Sorbirol 0 is prepared. 33% w/w of SM4 and 3% w/w of a long-chain alcohol is added to the oil mixture. An aqueous solution (A7) 4% w/w of zinc nitrate and 0.8% w/w magnesium chloride is prepared. An aqueous solution (A8) 2.7% w/w of KOH is prepared. 5% w/w of A7 kept at 60° C. is added slowly to I1 while stirring. The system, hereafter S4, is stirred for at least three hours while allowing the temperature to drop down to 20° C. Then, 5% w/w of A8 is slowly added while stirring for five hours, to obtain the final transparent product EX4.

Example 5

A system comprising 47 g of a 0.25 M aqueous solution of sodium chloride, 35 g of glycerol and 18 g of Rolamid CD is prepared (S5). While stirring, 15 g of EX1 are added to 85 g of S5. The resulting water in oil in water (w-o-w) microemulsion will be referred hereafter as EX5.

Example 6

A system comprising 47 g of a 0.25 M aqueous solution of sodium chloride, 35 g of ethylene glycol and 18 g of Rolamid CD is prepared (S6). While stirring, 15 g of EX1 are added to 85 g of S6. The resulting water in oil in water (w-o-w) microemulsion will be referred hereafter as EX6.

Comparative Example C1

The S1 of Example 1 comprising 33.4% w/w of SM and 66.6% w/w of LTMO is prepared. One batch containing S1 is kept at r.t. and stirred while 5.6% w/w of water is added very slowly. The final transparent microemulsion will be referred to as EXC1.

Comparative Example C2

Zinc hydroxide nanoparticles suspended in water have been prepared by mixing a $ZnCl_2$ 0.25M aqueous solution and a NaOH 0.5M aqueous solution containing xanthan gum. The solutions are mixed at high speed to obtain a suspension in water of zinc hydroxide nanoparticles (EXC2).

To compare the lubricant property of the water in oil microemulsions of the present invention in well fluids, a OFITE lubricity tester has been employed. The water based drilling fluid (WBM) (specific gravity 1.5, pH 9.7) employed for the test is composed as follow:

| WBM composition | % w/w |
| --- | --- |
| Fresh Water | 53.53% |
| Xanthan gum | 0.12% |
| Lampac EXLO | 0.31% |
| soda ash | 0.15% |
| Barite | 45.89% |

The amount of lubricant employed into the WBM is the 1.5% w/w respect to the water content in the WBM.

The oil based drilling fluid (OBM) employed for the test is composed as follow:

| OBM composition | % w/w |
| --- | --- |
| Low Toxicity Mineral Oil | 16.92 |
| Emulam PE | 1.37 |
| Emulam SE | 0.96 |
| Lime | 2.74 |
| Organophilic lignite | 1.64 |
| Fresh Water | 4.59 |
| CaCl2 | 2.74 |
| Emulam VPlus | 0.62 |
| Barite | 68.44 |

The amount of lubricant employed into the OBM is the 2.0% v/v.

The lubricant efficiency of the microemulsions of the present invention has been compared with a commercially available lubricant based on fatty acids triglycerides (TBL), with a microemulsion system devoid of metal hydroxide insoluble nanoparticles (EXC1) and with the dispersion comprising zinc hydroxide nanoparticles prepared in suspension (EXC2).

The reading of the OFITE lubricity meter has been collected for each sample of fluid after exposure for two minutes at 150 inch*pound torque. The percent reduction of the coefficient of friction (ΔCoF) is evaluated according to the following equation, in which FnoL is the OFITE reading without lubricant, and FL is the OFITE reading with lubricant:

$$\Delta CoF = 100 \cdot (FnoL - FL)/FnoL$$

The results of the tests on WBM are reported in Table 1.

TABLE 1

| Lubricant in WBM | ΔCoF |
|---|---|
| EX1 | 60 |
| EX2 | 50 |
| EXC1* | 5 |
| EXC2* | 5 |
| TBL* | 12 |
| EX5 | 28 |
| EX6 | 23 |

*comparative

Similar values for ΔCoF in WBM have been obtained considering the metal-to-sandstone coefficient of friction, measured employing a flat sandstone test block.

The results of the tests on OBM obtained with the OFITE lubricity tester are reported in Table 2.

TABLE 2

| Lubricant in OBM | ΔCoF |
|---|---|
| EX1 | 30 |
| TBL | 2 |

The persistence of the lubricant effect upon substitution of a lubricated fluid with a non lubricated fluid (fresh water, FW) has been evaluated by: i) recording the OFITE lubricity tester reading for fresh water, ii) adding 1% w/w of lubricant to fresh water, stirring and then recording the OFITE lubricity tester reading, iii) removing the lubricated fluid from the OFITE lubricity tester, iv) cleaning with acetone/water the significant components of the OFITE lubricity tester, v) replacing the lubricated fluid with fresh water and vi) collecting the OFITE reading at 150 inch pound over time (sampling time=30 minutes). The table below summarises the results (Table 3).

It compares the ΔCoF over time of lubricant EX1 and of comparative TBL. The results indicate that the products of the present invention extends the lubricant effect over time even when the fluid is replaced with an unlubricated fluid.

TABLE 3

| Time elapsed (hours) | ΔCoF FW + EX1 | FW + TBL |
|---|---|---|
| 0 | 80 | 57 |
| 2 | 76 | 2 |
| 4 | 70 | — |
| 6 | 60 | — |
| 8 | 30 | — |

Evaluation of the oscillation of the CoF over time induced by solid contents and/or stick-slip phenomenon.

A water based mud (WBM2) is prepared according to the following formula:

| WBM2 composition | ppb |
|---|---|
| Fresh Water | |
| Xanthan gum | 0.8 |
| LAMPAC EXLO | 2.0 |
| Soda Ash | 1.0 |
| Barite | 300.0 |

The comparison of the distribution of the CoF for WBM2 employing the microemulsion of Example 1, respect to WBM2 containing a commercial benchmark (fatty ester-based lubricant) and WBM2 without any lubricant additive is performed using a tribometer based on a pin on disk setup (from Tetra). The collection of the CoF values is achieved sampling the normal force (Fn) and the tangential force (Ft) each defined unit of time (u) over 7000 s. The CoF is obtained for each unit of time using the Coulomb's law (CoF($u_i$)=Ft($u_i$)/Fn($u_i$), where $u_i$ is the i-esim term of the time-array). The obtained data are reported as histograms, plotting on the x-axis and on the y-axis, respectively, the CoF value and the normalized probability distribution (arbitrary units) of the CoF. The probability distribution reflects the trend over time of the CoF for the given experiment.

The amount of lubricant employed in WBM2 is 1.0% w/v.

Figure 2:
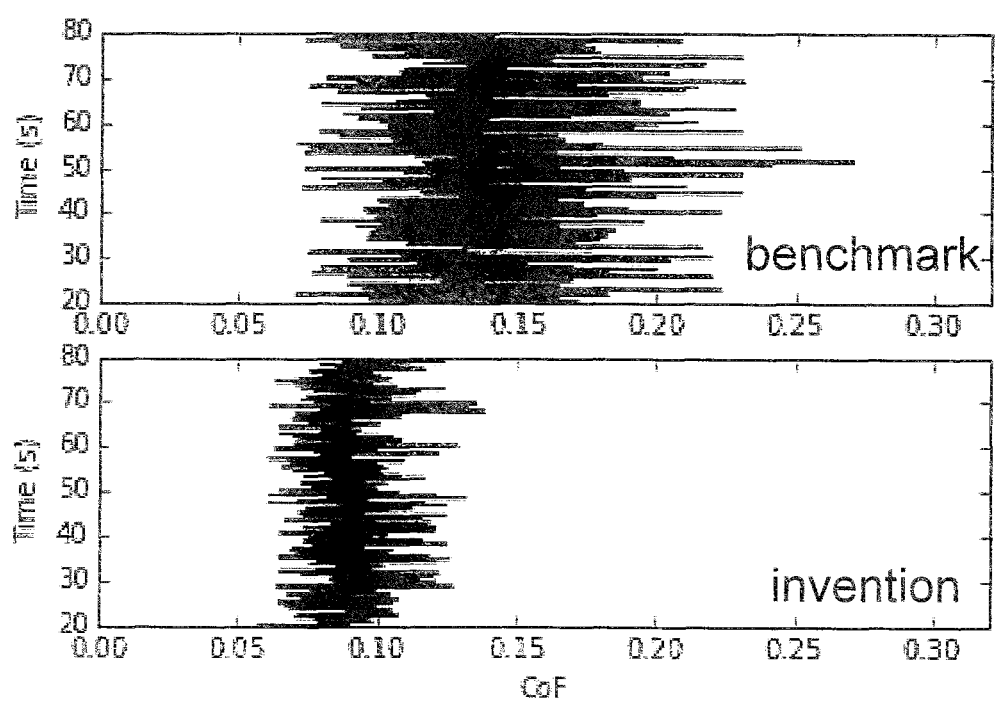
FIG. 2 shows the CoF oscillations over time of a water based fluid containing the microemulsion of the invention compared with the same fluid containing a commercially available lubricant.

The results are reported in FIG. 1 and FIG. 2.

From the figures, it is possible to observe that in the presence of the microemulsion of the disclosure, the distribution of the CoF (FIG. 1)—and thus its oscillations over time (FIG. 2)—are mitigated respect to the case of a commercially available lubricant.

The invention claimed is:

1. A method for increasing lubricity of a wellbore fluid comprising:
    i) preparing a water in oil microemulsion that contains insoluble particles of metal hydroxides and/or metal oxides in the inner aqueous phase, the insoluble particles being synthesized from their salt precursors in the water droplets of the microemulsion;
    ii) adding to the wellbore fluid the water in oil microemulsion;
    iii) injecting the wellbore fluid into a subterranean formation and
    iv) performing drilling, completion or coiled tubing operations in the subterranean formation,
    wherein the wellbore fluid is a drilling fluid, completion fluid or coiled tubing fluid, and the water in oil micro emulsion functions to increase lubricity of the wellbore fluid by reducing the coefficient of friction, and
    wherein the insoluble particles of metal hydroxides and/or metal oxides are selected from the group consisting of insoluble particles of zinc hydroxides, zinc oxides, manganese hydroxides, manganese oxides, magnesium hydroxides, magnesium oxides, and combinations thereof.

2. The method for increasing lubricity of a wellbore fluid of claim 1 wherein the insoluble particles of zinc hydroxides, zinc oxides, manganese hydroxides, manganese oxides, magnesium hydroxides, magnesium oxides, and combinations thereof are nanoparticles between 1 nm and 100 nm in size.

3. The method for increasing lubricity of a wellbore fluid of claim 2 wherein the nanoparticles are selected from the group consisting of nanoparticles of zinc hydroxide, zinc oxide, and combinations thereof.

4. The method for increasing lubricity of a wellbore fluid of claim 3 wherein the nanoparticles are selected from the group consisting of nanoparticles of zinc hydroxide, zinc oxide, and combinations thereof are between 1 nm and 40 nm in size.

5. The method for increasing lubricity of a wellbore fluid of claim 4 wherein the nanoparticles are nanoparticles of zinc hydroxide between 1 nm and 40 nm in size.

6. The method for increasing lubricity of a wellbore fluid of claim 5 wherein the microemulsion comprises:
   from 2 to 20 by weight % of an aqueous phase,
   from 5 to 40 by weight % of surfactants,
   from 0 to 20 by weight % of co-surfactants, and
   from 40 to 90 by weight % of oleaginous phase.

7. The method for increasing lubricity of a wellbore of claim 6 wherein the microemulsion comprises:
   from 4 to 10 by weight % of aqueous phase,
   from 20 to 35 by weight % of surfactants,
   from 6 to 15 by weight % of co-surfactants, and
   from 70 to 40 by weight % of oleaginous phase.

8. The method for increasing lubricity of a wellbore fluid of claim 7 wherein the concentration of particles in the aqueous phase of the microemulsion is from 0.2 M to 2 M.

9. The method for increasing lubricity of a wellbore fluid of claim 6 wherein the concentration of particles in the aqueous phase of the microemulsion is from 0.2 M to 2 M.

10. The method for increasing lubricity of a wellbore of claim 5 wherein, in step ii), the water in oil microemulsion is diluted in a saline aqueous solution to form a water in oil in water (w-o-w) microemulsion or a diluted water in oil microemulsion before being added to the fluid.

11. The method for increasing lubricity of a wellbore fluid of claim 2 wherein the microemulsion comprises:
    from 2 to 20 by weight % of an aqueous phase,
    from 5 to 40 by weight % of surfactants,
    from 0 to 20 by weight % of co-surfactants, and
    from 40 to 90 by weight % of oleaginous phase.

12. The method for increasing lubricity of a wellbore of claim 11
    wherein the microemulsion comprises:
    from 4 to 10 by weight % of aqueous phase,
    from 20 to 35 by weight % of surfactants,
    from 6 to 15 by weight % of co-surfactants, and
    from 70 to 40 by weight % of oleaginous phase.

13. The method for increasing lubricity of a wellbore fluid of claim 12 wherein the concentration of particles in the aqueous phase of the microemulsion is from 0.2 M to 2 M.

14. The method for increasing lubricity of a wellbore fluid of claim 11 wherein the concentration of particles in the aqueous phase of the microemulsion is from 0.2 M to 2 M.

15. The method for increasing lubricity of a wellbore fluid of claim 1 wherein the microemulsion comprises:
    from 2 to 20 by weight % of an aqueous phase,
    from 5 to 40 by weight % of surfactants,
    from 0 to 20 by weight % of co-surfactants, and
    from 40 to 90 by weight % of oleaginous phase.

16. The method for increasing lubricity of a wellbore of claim 15
    wherein the microemulsion comprises:
    from 4 to 10 by weight % of aqueous phase,
    from 20 to 35 by weight % of surfactants,
    from 6 to 15 by weight % of co-surfactants, and
    from 70 to 40 by weight % of oleaginous phase.

17. The method for increasing lubricity of a wellbore fluid of claim 16 wherein the concentration of particles in the aqueous phase of the microemulsion is from 0.2 M to 2 M.

18. The method for increasing lubricity of a wellbore fluid of claim 15 wherein the concentration of particles in the aqueous phase of the microemulsion is from 0.2 M to 2 M.

19. The method for increasing lubricity of a wellbore of claim 1 wherein, in step ii), the water in oil microemulsion is diluted in a saline aqueous solution to form a water in oil in water (w-o-w) microemulsion or a diluted water in oil microemulsion before being added to the fluid.

20. A method for increasing lubricity of a wellbore fluid comprising:
    i) preparing a water in oil microemulsion that contains insoluble particles of metal hydroxides and/or metal oxides in the inner aqueous phase, the insoluble particles being synthesized from their salt precursors in the water droplets of the microemulsion;
    ii) adding to the wellbore fluid the water in oil microemulsion;
    iii) injecting the wellbore fluid into a subterranean formation and
    iv) performing drilling, completion or coiled tubing operations in the subterranean formation,
    wherein the wellbore fluid is a drilling fluid, completion fluid or coiled tubing fluid, the concentration of insoluble particles of metal hydroxides and/or metal oxides in the wellbore fluid is from about 0.001 to about 0.003 wt. %, and the water in oil micro emulsion functions to increase lubricity of the wellbore fluid by reducing the coefficient of friction.

* * * * *